(12) United States Patent
Diallo et al.

(10) Patent No.: US 11,411,505 B2
(45) Date of Patent: Aug. 9, 2022

(54) DC-DC CONVERTER WITH PRE-CHARGING OF A FIRST ELECTRICAL NETWORK FROM A SECOND ELECTRICAL NETWORK

(71) Applicant: Valeo Siemens eAutomotive France SAS, Cergy (FR)

(72) Inventors: Massourang Diallo, Epinay sur Seine (FR); Mimoun Askeur, Vaureal (FR)

(73) Assignee: Valeo Siemens eAutomotive France SAS, Cergy (FR)

( * ) Notice: Subject to any disclaimer, the term of this patent is extended or adjusted under 35 U.S.C. 154(b) by 0 days.

(21) Appl. No.: 16/769,547

(22) PCT Filed: Nov. 20, 2018

(86) PCT No.: PCT/EP2018/081983
§ 371 (c)(1),
(2) Date: Jun. 3, 2020

(87) PCT Pub. No.: WO2019/110297
PCT Pub. Date: Jun. 13, 2019

(65) Prior Publication Data
US 2021/0006171 A1 Jan. 7, 2021

(30) Foreign Application Priority Data
Dec. 8, 2017 (FR) ...................................... 1761831

(51) Int. Cl.
*H02M 3/335* (2006.01)
*H02J 7/00* (2006.01)
(Continued)

(52) U.S. Cl.
CPC ......... *H02M 3/33592* (2013.01); *B60L 53/12* (2019.02); *H02J 7/007* (2013.01);
(Continued)

(58) Field of Classification Search
CPC .......... H02J 7/007; H02J 7/0068; H02J 7/345; H02J 2207/20; H02M 3/33592; B60L 53/12; B60L 2210/10
(Continued)

(56) References Cited

U.S. PATENT DOCUMENTS 5,181,169 A * 1/1993 Murugan ............... H02M 3/337
363/17
2007/0139975 A1* 6/2007 Yamauchi ......... H02M 3/33584
363/16
(Continued)

FOREIGN PATENT DOCUMENTS

FR 3042661 A1 4/2017

OTHER PUBLICATIONS

Search Report from French Intellectual Property Office on corresponding FR application (FR1761831) dated Jul. 3, 2018.
(Continued)

*Primary Examiner* — Edward Tso
*Assistant Examiner* — Aaron Piggush
(74) *Attorney, Agent, or Firm* — Klein, O'Neil & Singh, LLP

(57) ABSTRACT

The invention relates to an insulated DC-DC converter, in particular for a motor vehicle, comprising—a first circuit, connected to a first electrical grid, and including a primary branch comprising at least one induction coil, —a second circuit, connected to a second electrical grid, and comprising a secondary branch comprising at least one induction coil, each induction coil of the primary branch being coupled with an induction coil of the secondary branch in order to form a transformer. According to the invention, said converter comprises at least one additional branch comprising at least one additional induction coil, said at least one additional branch being connected to the electrical grid, and said
(Continued)

at least one additional induction coil being coupled with an induction coil of the secondary branch so that, according to one operating mode, the insulated DC-DC converter transfers energy from the low-voltage vehicle electrical grid to the electrical grid, in particular for pre-charging purposes.

8 Claims, 6 Drawing Sheets

(51) Int. Cl.
    *B60L 53/12*     (2019.01)
    *H02J 7/34*     (2006.01)
(52) U.S. Cl.
    CPC ............ *H02J 7/0068* (2013.01); *H02J 7/345* (2013.01); *B60L 2210/10* (2013.01); *H02J 2207/20* (2020.01)
(58) Field of Classification Search
    USPC .......................... 320/104, 108, 109, 140, 163
    See application file for complete search history.

(56) References Cited

U.S. PATENT DOCUMENTS

2016/0365803 A1* 12/2016 Torrico-Bascope ........................ H02M 3/33546
2020/0106367 A1* 4/2020 Bendani ............ H02M 3/33576

OTHER PUBLICATIONS

International Search Report and Written Opinion on corresponding PCT application (PCT/EP2018/081983) from International Searching Authority (EPO) dated Jan. 17, 2019.
Walker, Jim, "Four Quadrant Amplifier Based on the Flyback Topology", Applied Power Electronics Conference and Exposition, 1995. APEC '95. Conference Proceedings 1995., Tenth Annual Dallas, TX, USA 5-9 Mar. 1, New York, NY, USA, IEEE, US, Mar. 5, 1995, pp. 947-951, XP010147688, DOI: 10.1109/APEC.1995. 469054 ISBN: 978-0-7803-2482-4.

* cited by examiner

DC-DC CONVERTER WITH PRE-CHARGING OF A FIRST ELECTRICAL NETWORK FROM A SECOND ELECTRICAL NETWORK

TECHNICAL FIELD

The present invention relates to a DC voltage converter, in particular for an electric or hybrid vehicle. The present invention notably pertains to the field of electric or hybrid vehicles.

More precisely, the present invention relates to a DC-DC converter arranged between a high voltage electrical network and a low voltage electrical network, said converter notably being able, at the start up of the high voltage electrical network, to pre-charge said high voltage electrical network through energy delivered by the low voltage electrical network. Notably, the low voltage and high voltage networks are on board a vehicle.

BACKGROUND

As is known, an electric or hybrid automobile vehicle comprises an electric motorisation system supplied by a high voltage power supply battery via an on board high voltage electrical network and a plurality of auxiliary items of electrical equipment supplied by a low voltage power supply battery via an on board low voltage electrical network. Thus, the high voltage power supply battery ensures a function of supplying the electric motorisation system with energy enabling the propulsion of the vehicle. The low voltage power supply battery supplies auxiliary items of electrical equipment, such as on board computers, window winder motors, a multimedia system, etc. The high voltage power supply battery typically delivers a voltage comprised between 100 V and 900 V, preferably between 100 V and 500 V, whereas the low voltage power supply battery typically delivers a voltage of the order of 12 V, 24 V or 48 V. These two high and low voltage power supply batteries must be able to be charged.

The recharging of the high voltage power supply battery with electrical energy may be carried out in a known manner by connecting it, via the high voltage DC electrical network of the vehicle, to an external electrical network, for example the domestic AC electrical network.

It is also known to charge the low voltage battery directly from the high voltage battery. To this end, the high voltage battery is connected to the low voltage battery via a direct current-direct current voltage converter, commonly called DC-DC converter, galvanically isolated.

FIG. 1 represents a functional block diagram of an on board electrical system of the prior art. Such a system comprises an electric charger OBC designed to supply a high voltage power supply battery HB, typically dedicated to the propulsion of an electric or hybrid vehicle, and further comprises a low voltage battery LB ensuring the supply of items of electrical equipment of said vehicle.

In order to control the electric engine ENG driving the wheels of the vehicle, it is known to use an inverter INV making it possible to convert the direct current supplied by the high voltage power supply battery HB into one or more alternating control currents, for example sinusoidal.

Still with reference to FIG. 1, for the supply of the high voltage electrical supply network of the vehicle notably enabling the charging of the high voltage power supply battery HB, the electric charger OBC receives current coming from an external AC electrical network G1, such as a domestic AC electrical network, for supplying the high voltage power supply battery HB.

Finally, still with reference to FIG. 1, the charging of the low voltage battery LB being carried out in a known manner by the high voltage power supply battery HB, the system comprises for this purpose an isolated DC-DC converter DCDC, connected between the high voltage power supply battery HB and the low voltage battery LB.

In this context, during the powering up of the on board high voltage electrical network, that is to say, in an electric or hybrid vehicle, when the high voltage battery ensures a function of supplying the electric motorisation system with energy, as is known, inrush currents may appear, according to the terminology known to those skilled in the art, potentially of high intensity, detrimental to the electronic components of said on board high voltage electrical network because overcurrents lead in the long term to a reduction in the lifetime of the electronic components, in particular capacitors, which are on the on board high voltage electrical network.

In order to offset the appearance of these inrush currents, it is necessary to pre-charge the capacitive components of the on board high voltage electrical network. In the prior art, circuits dedicated to the pre-charging of the on board high voltage electrical network are implemented.

Such pre-charging circuits comprise relays and resistors specially configured to carry out pre-charging of the capacitive components of the on board high voltage electrical network, so as to reach a respective voltage at their terminals making it possible to avoid the appearance of detrimental inrush currents.

These pre-charging circuits used in the prior art have however a high cost and give rise to losses.

The present invention aims to overcome at least in part these drawbacks, by proposing an alternative solution to the implementation of a pre-charging circuit, in the context described above.

To this end, an isolated DC-DC converter is proposed able to carry out, according to a particular operating mode, the pre-charging of a first electrical network, notably on board high voltage, from a second electrical network, notably on board low voltage. To manage this, an isolated DC-DC converter and comprising a first circuit and a second circuit is modified galvanically, with each of the inductive coils controlled by switches. In such an isolated DC-DC converter, each inductive coil of the first circuit—or primary circuit—is coupled to a coil of the second circuit—or secondary circuit—, forming at least one transformer creating a magnetic circuit through which energy is transferred from the first electrical network to the second electrical network. In particular, as a reminder, the on board high voltage electrical network, in an electric or hybrid vehicle, is connected to a high voltage battery ensuring a function of supplying the electric motorisation system of said vehicle with energy. The on board low voltage electrical network, still in a vehicle, supplies a plurality of on board items of equipment of said vehicle.

According to the invention, the isolated DC-DC converter further comprises an additional branch comprising an additional inductive coil dimensioned to, by forming a magnetic circuit with at least one inductive coil of the second circuit of said converter, transfer energy from the first electrical network to the second electrical network so as to carry out the pre-charging of said first electrical network.

SUMMARY

To this end, the invention relates to an isolated DC-DC converter, notably for an automobile vehicle, comprising:

a first interface terminal configured to be connected to a first electrical network, a second interface terminal configured to be connected to a second electrical network, a first circuit, connected to the first interface terminal, and comprising at least one primary branch comprising at least one inductive coil, a second circuit, connected to the second interface terminal, and comprising a secondary branch comprising at least one inductive coil, each inductive coil of said at least one primary branch being coupled to an inductive coil of the secondary branch to form at least one transformer, such that, according to a first operating mode, the isolated DC-DC converter is configured to transfer energy from the first electrical network to the second electrical network, through the first and second circuits, via the magnetic circuit(s) formed by the coupled inductive coils of the primary branch and the secondary branch. Said isolated DC-DC converter is remarkable in that it comprises at least one additional branch comprising at least one additional inductive coil, said at least one additional branch being connected to the first interface terminal, and said at least one additional inductive coil being coupled to an inductive coil of the secondary branch, such that, according to a second operating mode, the converter is configured to transfer energy from the second electrical network to the first electrical network, through the second circuit and the additional branch, via said at least one inductive coil of the secondary branch and said at least one additional inductive coil of the additional branch.

By means of this additional branch, configured in a suitable manner, the isolated DC-DC converter according to the invention ensures a function of pre-charging of the first electrical network, in particular of an on board high voltage electrical network.

According to an embodiment, the additional branch is configured to inhibit any transfer of energy from the second electrical network to the first electrical network when the first operating mode is active.

Advantageously, the additional branch comprises a one-way or two-way switch in such a way as to open the additional branch when the first operating mode is active.

Advantageously, the first circuit and the second circuit comprise switches to control each inductive coil.

According to an embodiment, the first circuit comprises two primary branches each comprising two inductive coils and the second circuit comprises a secondary branch comprising two inductive coils, the inductive coils of each primary branch being coupled by pair and respectively with an inductive coil of the secondary branch, so as to form two transformers each having three inductive coils.

According to an embodiment, the DC-DC converter according to the invention comprises a single additional branch having an additional inductive coil coupled with the inductive coil of the secondary branch of the second circuit belonging to the first transformer, or with the inductive coil of the secondary branch belonging to the second transformer, or comprising two additional branches each having an additional inductive coil, the additional inductive coil of one of the additional branches being coupled with one of the inductive coils of the secondary branch and the other of said additional inductive coils being coupled with the other of said inductive coils of the secondary branch.

In an automobile vehicle, the first electrical network is a high voltage electrical network and the second electrical network is a low voltage electrical network. A high voltage battery is connected to the high voltage electrical network and a low voltage battery is connected to the low voltage electrical network.

The present invention also targets a method for pre-charging a first electrical network from energy coming from a second electrical network, during the start up of said first electrical network, by means of the implementation of an isolated DC-DC converter such as briefly described above, of which the first interface terminal is connected to the first electrical network and of which the second interface terminal is connected to the second electrical network, the isolated DC-DC converter being implemented in the second operating mode.

The present invention also targets a method for discharging a first electrical network during a disconnection of said first electrical network, said first electrical network comprising, during said disconnection, at least one charged capacitor, said discharge comprising the implementation of an isolated DC-DC converter such as briefly described above, of which the first interface terminal is connected to the first electrical network and of which the second interface terminal is connected to the second electrical network, the isolated DC-DC converter, and wherein the switch of the additional branch is two-way, the isolated DC-DC converter being implemented according to a third operating mode wherein the energy stored in said at least one charged capacitor is transferred to the second electrical network through said at least one additional transformer formed of said at least one additional inductive coil and an inductive coil of the secondary branch, for discharging said at least one charged capacitor.

Advantageously, the energy transferred to the second circuit during the discharge of said at least one capacitor is used for charging a battery connected to said second electrical network.

The present invention furthermore targets an electric or hybrid automobile vehicle, comprising a first electrical network and a second electrical network, a high voltage battery connected to said first electrical network and a low voltage battery connected to said second electrical network, said vehicle furthermore comprising an isolated DC-DC converter such as briefly described above, connected between said first electrical network and said second electrical network.

Such an electric or hybrid vehicle comprises an electric motorisation system supplied by the high voltage power supply battery via the first electrical network, a plurality of auxiliary items of electrical equipment supplied by the low voltage power supply battery via the second electrical network.

BRIEF DESCRIPTION OF THE DRAWINGS

The invention will be better understood on reading the description that follows, given uniquely by way of example, and by referring to the appended drawings given as non-limiting examples, in which identical references are given to similar objects and in which.

It should be noted that the figures set out the invention in a detailed manner for implementing the invention, said figures obviously being able to serve to better define the invention if needs be.

DETAILED DESCRIPTION

In the description that will be made hereafter, an implementation of the invention in an electric or hybrid automobile vehicle will be described. This should not however be interpreted in a restrictive manner, the invention notably being able to be implemented in any type of vehicle.

An electric or hybrid vehicle comprises a high voltage power supply battery, an electric motorisation system, an on board high voltage electrical network, a low voltage power supply battery, an on board low voltage electrical network and a plurality of auxiliary items of electrical equipment.

The on board high voltage electrical network connects the high voltage power supply battery and the electric motorisation system in order that the high voltage power supply battery ensures a function of supplying the electric motorisation system with energy enabling the propulsion of the vehicle. As described previously, the high voltage power supply battery typically delivers a voltage comprised between 100 V and 900 V, preferably between 100 V and 500 V.

The on board low voltage electrical network connects the low voltage power supply battery and the plurality of auxiliary items of electrical equipment in order that the low voltage power supply battery supplies the auxiliary items of electrical equipment, such as on board computers, window winder motors, a multimedia system, etc. As is known, the low voltage power supply battery typically delivers a voltage of the order of 12 V, 24 V or 48 V.

The recharging of the high voltage power supply battery with electrical energy may be carried out by connecting it, via a high voltage DC electrical network of the vehicle, to an external electrical network, for example the domestic AC electrical network.

The recharging of the low voltage battery is carried out directly from the high voltage battery. To this end, the high voltage battery is connected to the low voltage battery via a DC-DC converter.

FIGS. 2 to 5 represent different electronic diagrams corresponding to an isolated DC-DC converter 1, 10, 11, 12 connected between a first on board electrical network HV, high voltage, and a second on board electrical network LV, low voltage.

Figure 1:
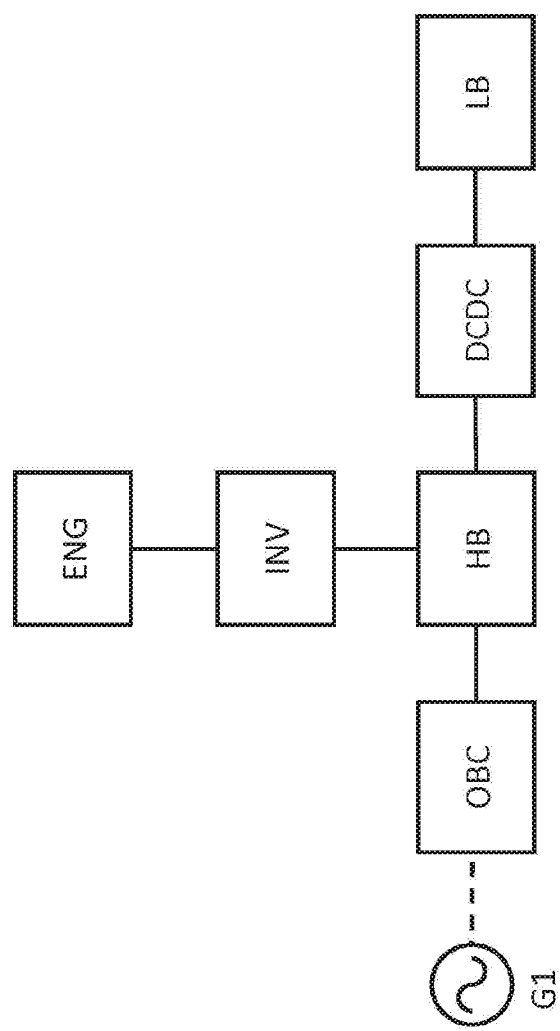
FIG. 1 (already described) illustrates a functional block diagram of a known electrical system, on board an electric or hybrid vehicle.
Figure 2:
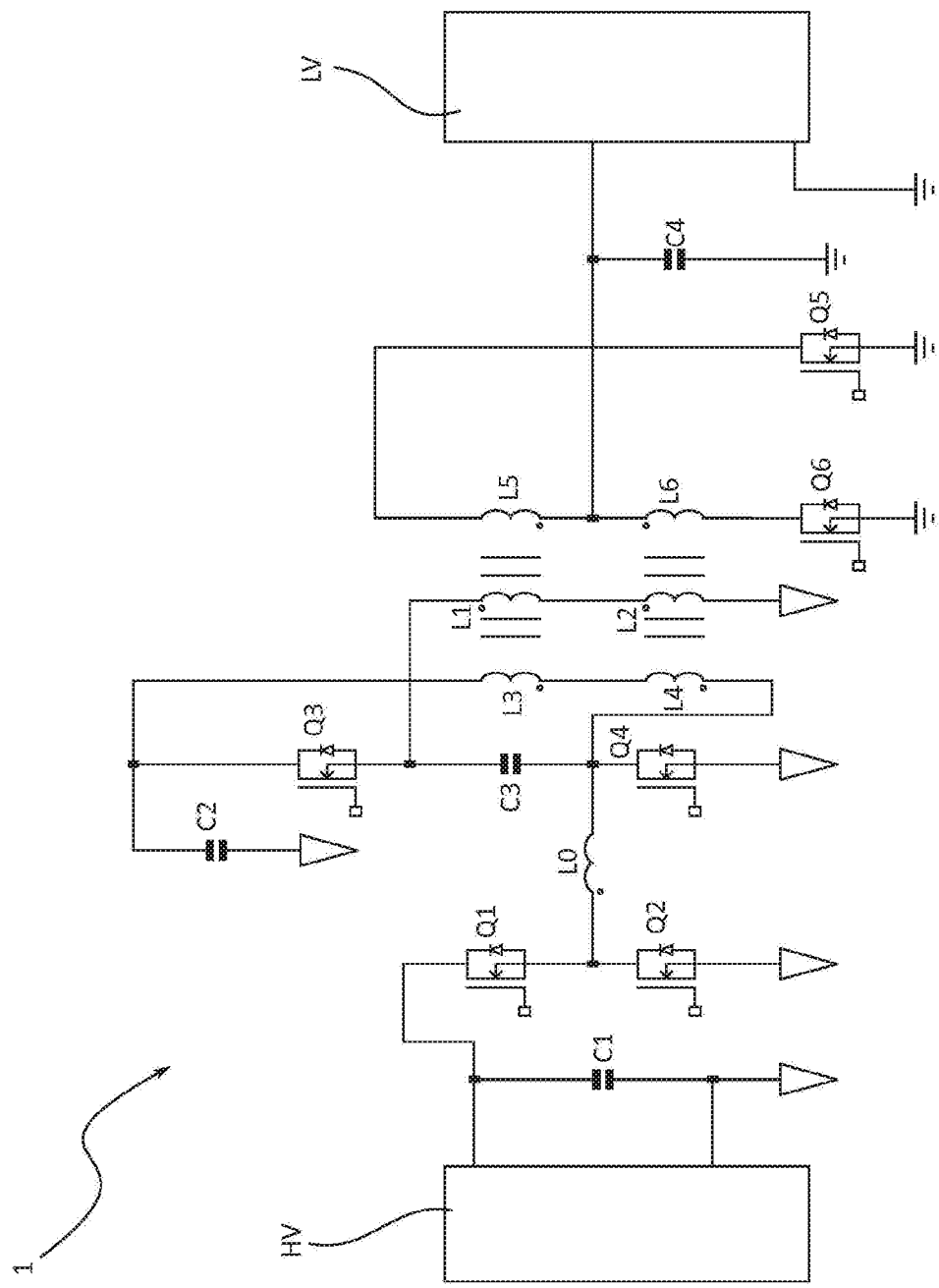
FIG. 2 illustrates an isolated DC-DC converter according to the prior art.
Figure 3:
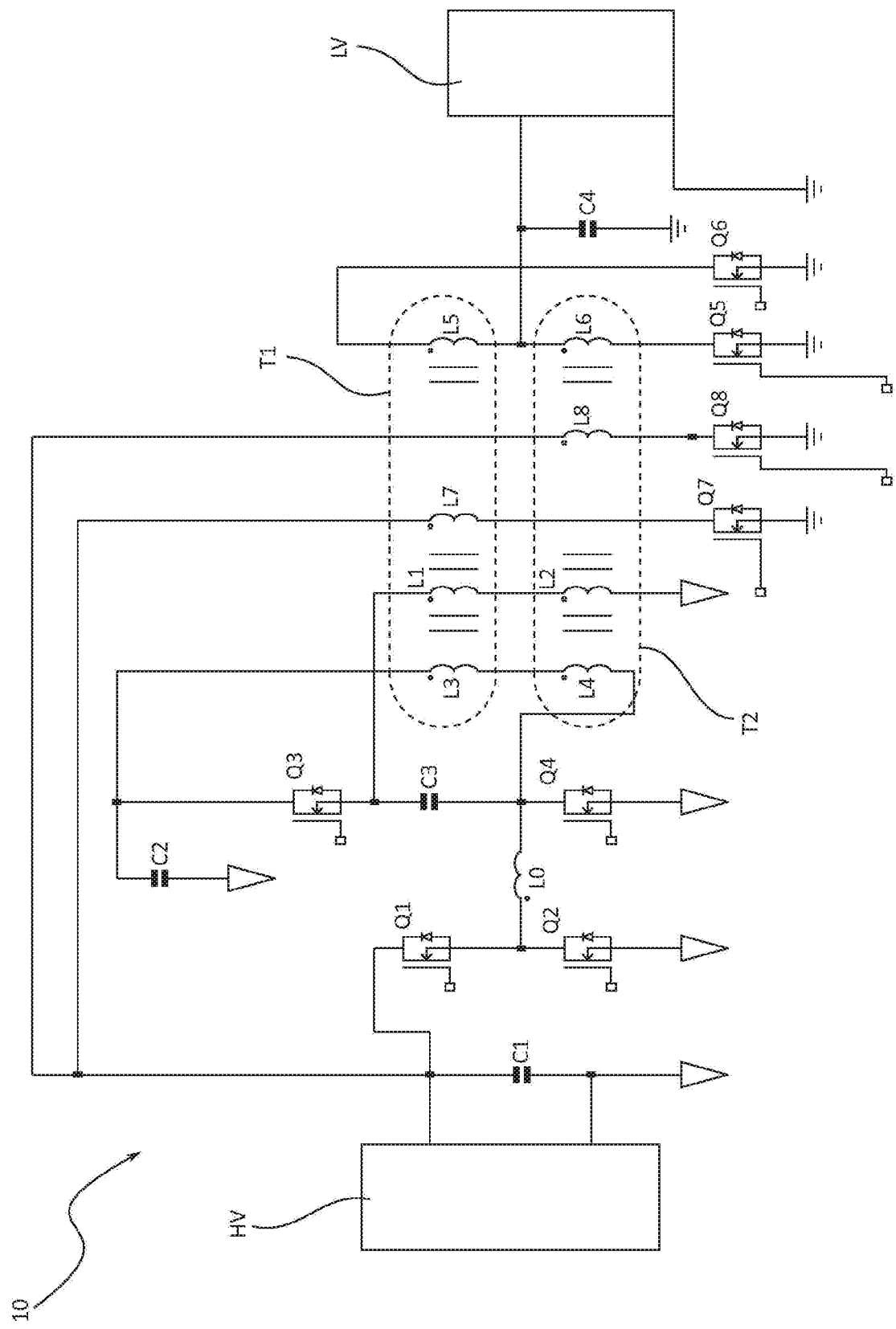
FIG. 3 illustrates a first embodiment of an isolated DC-DC converter according to the invention.
Figure 4:
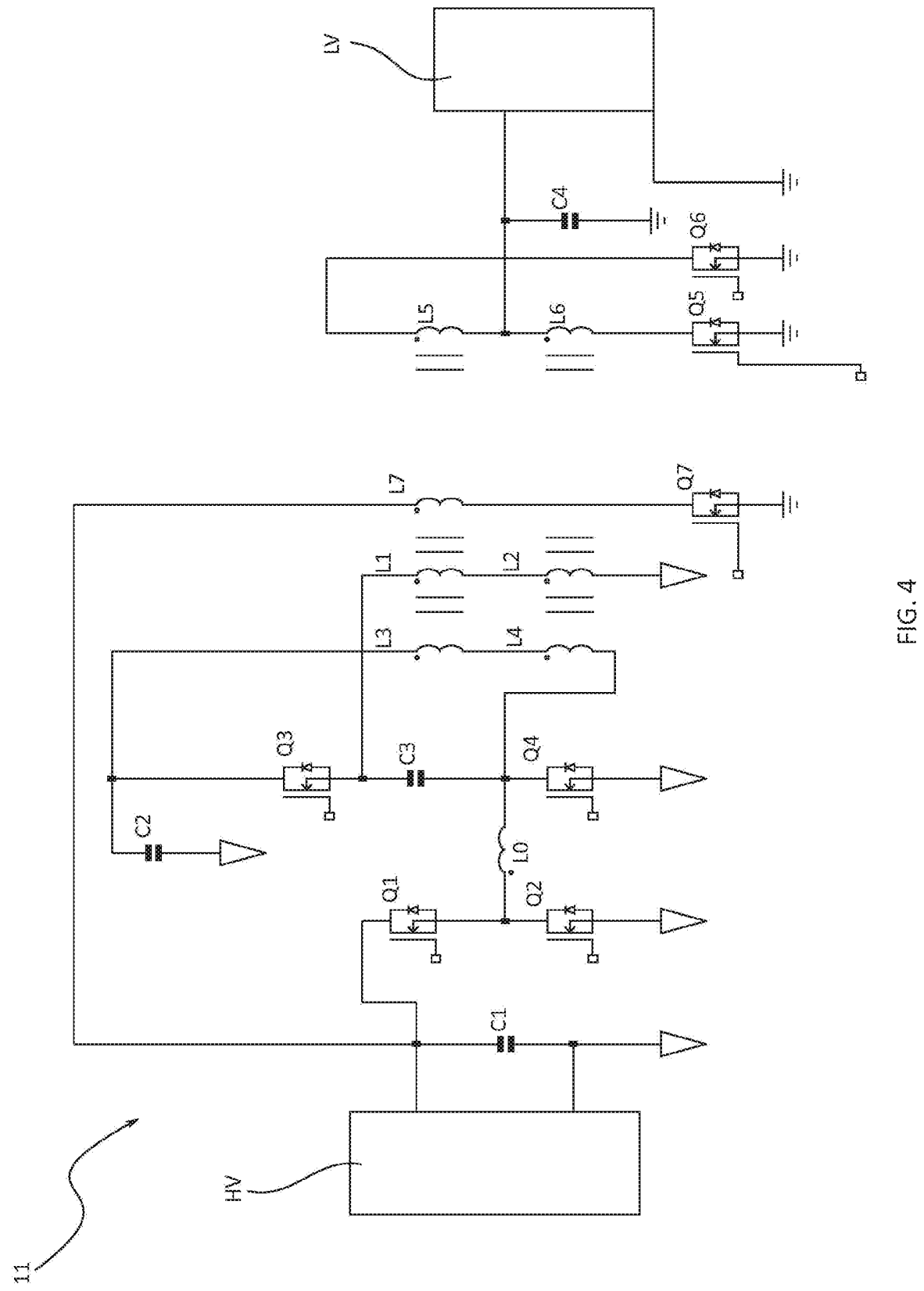
FIG. 4 illustrates a second embodiment of an isolated DC-DC converter according to the invention.
Figure 5:
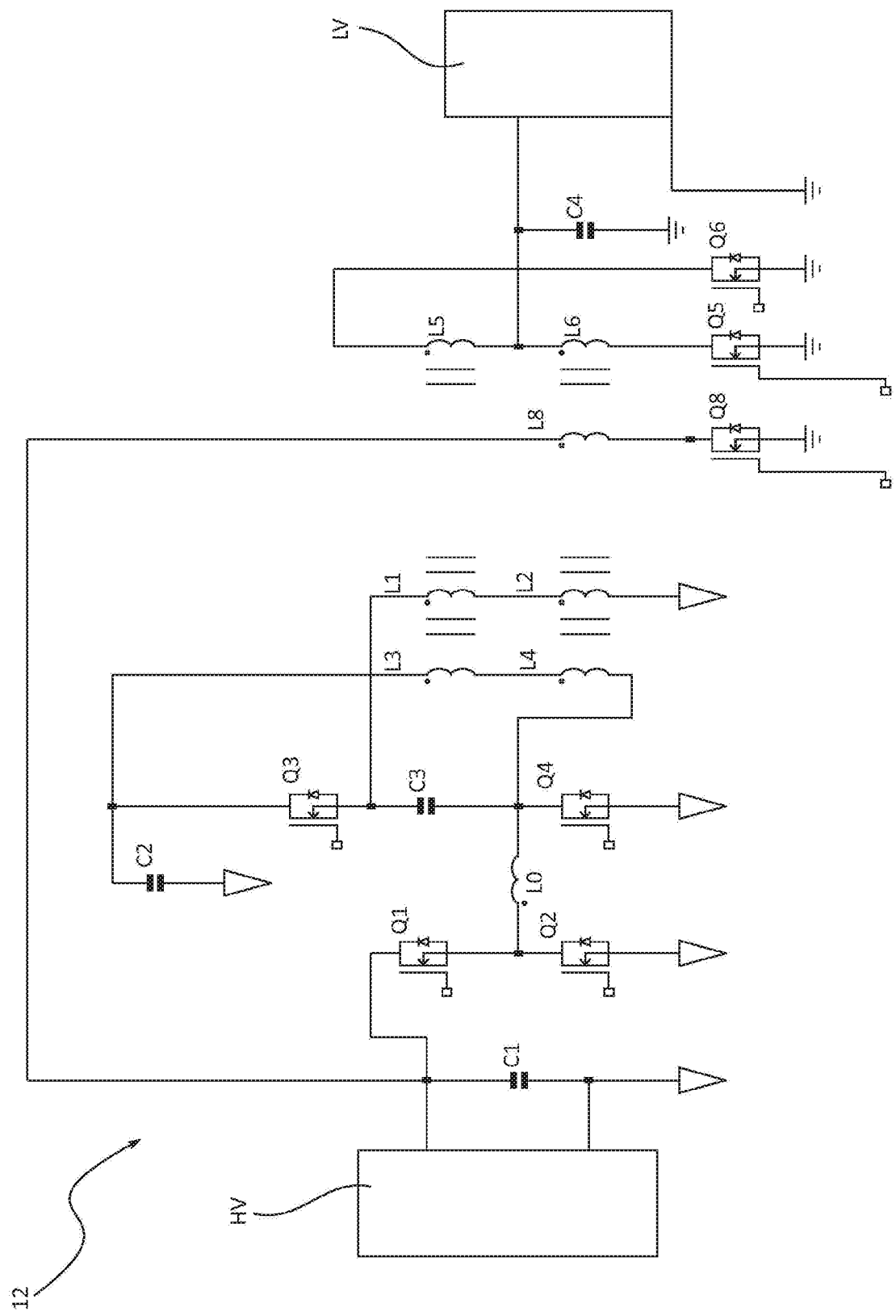
FIG. 5 shows a third embodiment of a DC-DC converter according to the invention.

FIG. 2 corresponds to the electronic diagram of an isolated DC-DC converter according to the prior art whereas FIGS. 3 to 5 represent different embodiments of the isolated DC-DC converter according to the invention.

As explained previously, the DC-DC converter 1, 10, 11, 12 has for function the conversion, potentially reversible, of a high DC voltage into a low DC voltage. The high voltage, typically comprised between 10 V and 500 V, is delivered to the terminals of the on board high voltage electrical network HV or is derived therefrom. The low voltage, typically equal to around 12 V, 24 V or 48 V is delivered to the terminals of the on board low voltage electrical network LV or is derived therefrom.

To this end, as explained previously, the conversion ratio is configured between an input voltage and an output voltage of transformers constituted of the coupled inductive coils L1, L3 and L5 on the one hand, forming a first transformer T1, and the coupled inductive coils L2, L4 and L6 on the other hand, forming a second transformer T2, the inductive coils L1 and L2 being connected in series to a first branch of the first circuit—or primary circuit—, the inductive coils L3 and L4 being connected in series to a second branch of the first circuit, and the inductive coils L5 and L6 being connected in series to a branch of the second circuit or secondary circuit.

The primary circuit comprises the inductive coils L1, L2, L3, L4 and the switches Q3, Q4 which contribute to the control of the energy exchanged between the primary circuit and the secondary circuit. In the secondary circuit, the switch Q6 is connected between an electrical earth and a terminal of the inductive coil L6 in order to control the energy circulating in the coil L6. The switch Q5 is connected between an electrical earth and a terminal of the inductive coil L5 in order to control the energy circulating in the coil L5. The switches Q5, Q6 of the secondary circuit thus form a synchronous rectifier circuit.

A capacitor C3 is connected between the first branch and the second branch of the first circuit. In particular, the capacitor C3 is connected between two respective terminals of the switches Q3, Q4 controlling the energies of the inductive coils L1, L2 of the first branch of the first circuit and L3, L4 of the second branch of the first circuit, respectively. The other terminal of the switch Q3 is further connected to another capacitor C2. The capacitor C2 has a function of voltage source for the primary circuit of the first circuit. The capacitor C2 is connected on the one hand to the terminal of the switch Q3 and on the other hand to an earth, notably the earth of the first circuit. An inductor L0 is furthermore connected between a node to which are connected the capacitor C3 and the switch Q4 and a mid-point to which are connected two respective terminals of the switches Q1, Q2 connected to the input of the isolated DC-DC converter 1, 10, 11, 12. The other terminal of the input switch Q1 is furthermore connected to a first interface terminal of the isolated DC-DC converter 10, 11, 12. The first interface terminal is connected to the on board high voltage electrical network HV. The other terminal of the input switch Q2 is furthermore connected to an electrical earth, notably an electrical earth of the first circuit of the isolated DC-DC converter 10, 11, 12. The inductor L0, the capacitors C3, C2, the switches Q1, Q2, Q3, Q4, Q5, Q6 and the inductive coils of the primary and secondary circuits thus form a voltage converter circuit. The switches Q1, Q2 form a half-H bridge making it possible to supply to the first and second transformers a lower voltage than the voltage delivered by the on board high voltage electrical network HV at its interface terminals.

Figure 6:
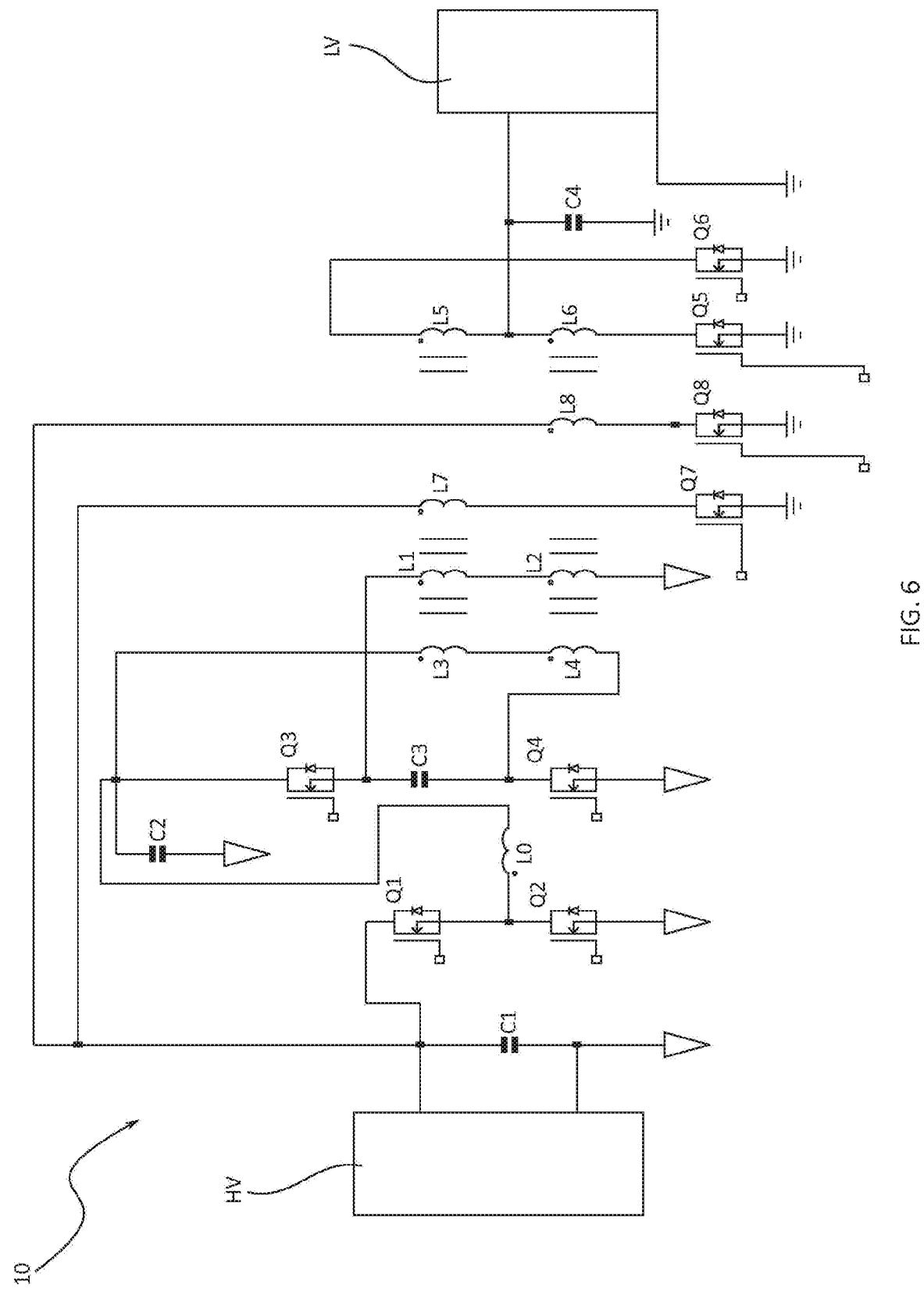
FIG. 6 shows another example of a DC-DC converter according to the invention.

Alternatively, the inductor L0 could be connected between the node to which are connected the capacitor C2 and the switch Q3 and the mid-point to which are connected the switches Q1, Q2 connected to the input of the isolated DC-DC converter 1, 10, 11, 12, for example as illustrated in FIG. 6, in a similar manner furthermore to the example of FIG. 3. In FIGS. 4 and 5, the inductor L0 could also be connected in this manner.

Preferably, said switches Q1 to Q6 are MOSFETS, notably soft switching MOSFETS, that is to say able to switch at zero voltage, otherwise designated ZVS for "Zero Voltage Switching".

According to a first operating mode of the isolated DC-DC converter 1, 10, 11, 12, energy is transferred from the on board high voltage electrical network HV to the on board low voltage electrical network LV when said on board high voltage electrical network HV is active, that is to say when a high voltage battery (not represented) delivers high voltage to its terminals, with a view to supplying energy for charging a low voltage battery (not represented) connected to the on board low voltage electrical network LV. To this end, a control module controls the switches Q1, Q2, Q3, Q4 so as to alternately store energy in the inductive coils L1 and L3 and in the inductive coils L2 and L4, over a part of the corresponding period, to transfer it to the second circuit, respectively to the inductive coils L5 and L6 over a complementary part of the period. Notably, the control module controls the switches Q1, Q2, Q3, Q4 by delivering thereto PWM (Pulse Width Modulation) signals. In particular, the signals delivered to the switches Q1, Q2 have a variable duty cycle and the signals delivered to the switches Q3, Q4 have constant duty cycles. In the first operating mode, the converter converts the voltage of the high voltage network HV to the low voltage network LV by varying the duty cycle of the switches Q1, Q2 while maintaining constant the duty cycle of the switches Q3, Q4. However, the converter could operate differently, for example by varying all the duty cycles.

It should be noted that this operation from two transformers in parallel controlled alternately is not obligatory because it is possible to operate with a single isolated transformer. However, the use of two transformers in parallel controlled alternately makes it possible to resort to smaller electronic components (diodes, switches, capacitors), thus less bulky and often less expensive, because the maximum power transferred by each transformer alternately is reduced by half. Within the context of an implementation in an automobile vehicle, the maximum power corresponding to the transferred energy could be equal to around 400 W per transformer in the case where two transformers in parallel are used, compared to 800 W for a single transformer.

Between the interface terminals of the on board high voltage electrical network HV, an input capacitor C1 of the network HV is charged at the start up of the on board high voltage electrical network HV.

The present invention makes it possible to ensure the pre-charging of said input capacitor C1 during the start up of the on board high voltage electrical network HV, making it possible to avoid the circulation of inrush currents.

An input capacitor 4 of the on board low voltage electrical network LV is also provided, connected between a second interface terminal of the isolated DC-DC converter 10, 11, 12 and an electrical earth, notably an electrical earth of the second circuit of the isolated DC-DC converter 10, 11, 12.

In the first operating mode, the energy transferred from the on board high voltage electrical network HV to the on board low voltage electrical network LV notably enables the charging of a low voltage battery (not represented) connected to said on board low voltage electrical network LV.

The isolated DC-DC converter according to the invention enables the implementation of a second operating mode, or even a third operating mode. Three embodiments of the isolated DC-DC converter according to the invention are represented in FIGS. 3 to 5.

To this end, the isolated DC-DC converter 10, 11, 12 comprises at least one additional branch comprising an additional inductive coil L7, L8. Said at least one additional branch extends between an electrical earth and the first interface terminal of the isolated DC-DC converter 10,11,12. Said at least one additional inductive coil L7, L8 is coupled respectively to a coil of the second circuit L5, L6, able to transfer energy from the on board low voltage electrical network LV to the on board high voltage electrical network HV. To this end, a control module controls the switches Q5, Q6, notably by a PWM signal at fixed frequency, so as to store energy in the inductive coils L5 and/or L6, over a part of the corresponding period, to transfer it to said at least one additional inductive coil L7, L8, and thus to the on board high voltage electrical network HV, over a complementary part of the period.

The transformation ratio of the additional transformer, otherwise called the ratio between the input voltage, corresponding to the voltage delivered by the on board low voltage electrical network LV, and the output voltage, corresponding to the voltage delivered to the on board high voltage electrical network HV, in particular to the terminals of the input capacitor C1 of said on board high voltage electrical network HV, is configured to enable the charging of said input capacitor C1 of the on board high voltage electrical network HV within a predefined maximum time.

More generally, the additional transformer is configured to pre-charge the on board high voltage electrical network HV, in particular within a predefined maximum time. In the context of an implementation in a vehicle, the capacitor of the on board high voltage electrical network to pre-charge has a value of around 2 mF to charge in less than 200 ms. Thanks to this pre-charging, the circulation of inrush current at the start up of the on board high voltage electrical network HV is avoided.

The additional branch is configured to inhibit any transfer of energy through said at least one additional branch when the first operating mode is active, that is to say when energy is transferred via the isolated DC-DC converter 10, 11, 12 from the on board high voltage electrical network HV to the on board low voltage electrical network LV. For example, the transformation ratio between the inductive coil L5 and the additional inductive coil L7 and/or, respectively, between the inductive coil L6 and the additional inductive coil L8, is chosen in such a way as to avoid that the second operating mode can be active when the first operating mode is already active. In particular, the transformation ratio between the inductive coil L5 and the additional inductive coil L7 is equal to 10. When the voltage of the low voltage electrical network LV is equal to 16 V, then the voltage at the terminals of the additional inductive coil L7 is equal to 160 V. If the voltage of the high voltage electrical network HV is comprised between 210 V and 500 V, then this voltage is greater than the voltage at the terminals of the additional inductive coil L7, the intrinsic diode of the switch Q7 is closed, the switch Q7 itself being open. Thus, there is no transfer of energy from the secondary circuit to the additional inductive coil L7.

In order to achieve the inhibition described above, the additional branch may also comprise, in the embodiments represented in FIGS. 3 to 5, a switch Q7, Q8 connected between a terminal of each additional inductive coil L7, L8 and an electrical earth or between a terminal of each additional inductive coil L7, L8 and the first interface terminal of the isolated DC-DC converter. Each switch may be one-way, for example a diode (not represented), or a two-way switch, such as a transistor Q7, Q8, for example a MOSFET transistor.

With reference to FIG. 3, the isolated DC-DC converter 10 thus comprises two additional branches respectively comprising an additional inductive coil L7, L8. Each additional branch connects an interface terminal of the on board high voltage electrical network HV and an electrical earth.

The inductive coils L7, L8 may operate in an interleaved manner with the two inductive coils L5, L6 of the secondary circuit.

On each additional branch, an inductive coil L7, L8 has a terminal connected to an interface terminal of the on board high voltage electrical network HV and a terminal connected to a terminal of a switch Q7, Q8 which controls it, the other terminal of said switch Q7, Q8 being connected to an electrical earth.

Each additional inductive coil L7, L8 is coupled to a respective inductive coil L5, L6 of the second circuit, forming two additional transformers controlled respectively by the switches Q5, Q6, Q7, Q8 and forming two additional magnetic circuits able to transfer energy from the on board low voltage electrical network LV to the on board high voltage electrical network HV, in particular for pre-charging purposes, notably of the capacitor C1.

In the embodiment represented in FIG. 4, the isolated DC-DC converter 11 comprises a single additional branch comprising an additional inductive coil L7 coupled to the inductive coil L5 of the second circuit belonging furthermore to the first transformer. The coupled inductive coils L5, L7 form an additional transformer creating an additional magnetic circuit able to transfer energy from the on board low voltage electrical network LV to the on board high voltage electrical network HV, in particular for pre-charging purposes, notably of the capacitor C1.

In a corresponding manner, in the embodiment represented in FIG. 5, the isolated DC-DC converter 12 comprises a single additional branch comprising an additional inductive coil L8 coupled to the inductive coil L6 of the second circuit belonging furthermore to the second transformer. The coupled inductive coils L6, L8 form an additional transformer creating an additional magnetic circuit able to transfer energy from the on board low voltage electrical network LV to the on board high voltage electrical network HV, in particular for pre-charging purposes.

As has been described previously, it is possible to replace the switches Q7 and/or Q8, according to the embodiment, by diodes (not represented) ensuring the function of one-way switch respectively connected between a terminal of the inductive coil L7, L8 and an interface terminal of the on board high voltage electrical network HV. Such diodes have the function of inhibiting any transfer of energy, via the additional branch(es), from the on board high voltage electrical network HV to the on board low voltage electrical network LV. These diodes notably have their cathode terminal oriented towards the first interface terminal of the isolated DC-DC converter.

The use of two-way switches Q7, Q8, of MOSFET type, advantageously enable the implementation of a third operating mode of the isolated DC-DC converter 10, 11, 12 according to the invention. According to this third operating mode, at the disconnection of the on board high voltage electrical network HV, the first operating mode becoming inactive, said switches Q7, Q8 are controlled in the on state in the sense of a transfer of energy from the on board high voltage electrical network HV (in the course of being turned off) to the on board low voltage electrical network LV to which is connected a low voltage battery. This transfer of energy enables the passive or active discharge of the capacitors of the on board high voltage electrical network HV, in particular of the input capacitor C1, during the disconnection of said on board high voltage electrical network HV.

On the one hand the second circuit comprising the inductive coils L5, L6 and the two-way switches Q5, Q6 and on the other hand said at least one additional branch comprising respectively an additional inductive coil L7, L8 and a two-way switch Q7, Q8 then form a two-way DC-DC voltage converter.

Advantageously, the energy thus recovered by the on board low voltage electrical network LV may enable the charging of a low voltage battery connected to said on board low voltage electrical network LV.

The invention claimed is:

1. An isolated DC-DC converter, for an automobile vehicle, comprising:
   a first interface terminal configured to be connected to a first electrical network,
   a second interface terminal configured to be connected to a second electrical network,
   a first circuit, connected to the first interface terminal, and comprising at least one primary branch comprising at least one inductive coil,
   a second circuit, connected to the second interface terminal, and comprising a secondary branch comprising at least one inductive coil,
   each inductive coil of said at least one primary branch being coupled to an inductive coil of the secondary branch to form at least one transformer,
   such that, according to a first operating mode, the isolated DC-DC converter is configured to transfer energy from the first electrical network to the second electrical network, through the first and second circuits, via magnetic circuit(s) formed by the coupled inductive coils of the primary branch and the secondary branch,
   said isolated DC-DC converter comprising at least one additional branch comprising at least one additional inductive coil, said at least one additional branch being connected to the first interface terminal, and said at least one additional inductive coil being coupled to an inductive coil of the secondary branch,
   such that, according to a second operating mode, the isolated DC-DC converter is configured to transfer energy from the second electrical network to the first electrical network, through the second circuit and the additional branch, via said at least one inductive coil of the secondary branch and said at least one additional inductive coil of the additional branch,
   wherein the first circuit comprises two primary branches each comprising two inductive coils and the second circuit comprises a secondary branch comprising two inductive coils, the inductive coils of each primary branch being coupled by pair and respectively with an inductive coil of the secondary branch, so as to form two transformers each having three inductive coils, and
   wherein the DC-DC converter comprises:
      a single additional branch having an additional inductive coil coupled with the inductive coil of the secondary branch of the second circuit belonging to the first transformer, or with the inductive coil of the secondary branch belonging to the second transformer, or
      two additional branches each having an additional inductive coil, the additional inductive coil of one of the additional branches being coupled with one of the inductive coils of the secondary branch and the other of said additional inductive coils being coupled with the other of said inductive coils of the secondary branch.

2. The isolated DC-DC converter according to claim 1, wherein the additional branch is configured to inhibit any transfer of energy from the second electrical network to the first electrical network when the first operating mode is active.

3. The isolated DC-DC converter according to claim 2, wherein the additional branch comprises a one-way or two-way switch in such a way as to open the additional branch when the first operating mode is active.

4. The isolated DC-DC converter according to claim 1, wherein the first circuit and the second circuit comprise switches to control the energy circulating in each inductive coil.

5. A method of pre-charging a first electrical network from energy coming from a second electrical network, during the start up of said first electrical network, through implementation of the isolated DC-DC converter according to claim 1, of which the first interface terminal is connected to the first electrical network and of which the second interface terminal is connected to the second electrical network, the isolated DC-DC converter being implemented according to said second operating mode.

6. A method of discharging a first electrical network into a second electrical network during a disconnection of said first electrical network, said first electrical network comprising, during said disconnection, at least one charged capacitor, said discharge comprising the implementation of the isolated DC-DC converter according to claim 3, of which the first interface terminal is connected to the first electrical network and of which the second interface terminal is connected to the second electrical network, the isolated DC-DC converter and wherein the switch of the additional branch is two-way, the isolated DC-DC converter being implemented according to a third operating mode wherein the energy stored in said at least one charged capacitor is transferred to the second electrical network through said at least one additional transformer formed of said at least one additional inductive coil and an inductive coil of the secondary branch, for discharging said at least one charged capacitor.

7. The method according to claim 6, wherein the energy transferred to the second circuit during the discharge of said at least one capacitor is used for charging a battery connected to said second electrical network.

8. An electric or hybrid automobile vehicle, comprising a first on board electrical network called on board high voltage electrical network and a second on board electrical network called on board low voltage electrical network, a high voltage battery connected to said on board high voltage electrical network and low voltage battery connected to said on board low voltage electrical network, said vehicle furthermore comprising the isolated DC-DC converter according to claim 1, connected between said on board high voltage electrical network and said on board low voltage electrical network.

* * * * *